United States Patent [19]

Kobilan

[11] Patent Number: 4,872,575

[45] Date of Patent: Oct. 10, 1989

[54] PROTECTIVE HOUSING STRUCTURE FOR UNDERGROUND DEVICES

[76] Inventor: Errol D. Kobilan, 13030 Meridian Rd., Elbert, Colo. 80106

[21] Appl. No.: 68,115

[22] Filed: Jun. 30, 1987

[51] Int. Cl.$^4$ ............................................. H02G 3/08
[52] U.S. Cl. ..................................... 220/3.3; 220/18; 220/23.4; 220/23.86
[58] Field of Search ................... 220/3.2, 3.3, 3.4, 3.8, 220/23.4, 18, 23.86

[56] References Cited

U.S. PATENT DOCUMENTS

| | | | |
|---|---|---|---|
| 1,553,696 | 9/1925 | Kay | 220/3.4 |
| 2,284,466 | 5/1942 | Zelt | 220/3.3 |
| 2,378,861 | 6/1945 | Peevey | 220/3.4 |
| 3,033,913 | 5/1962 | Dietze | 220/3.2 |
| 3,131,829 | 5/1964 | Masser | 220/23.4 |
| 3,194,426 | 7/1965 | Brown, Jr. | 220/23.4 |
| 3,405,834 | 10/1968 | Butler et al. | 220/3.4 |
| 3,490,637 | 1/1970 | Pope | 220/3.4 |
| 3,770,873 | 11/1973 | Brown | 220/3.2 |
| 3,837,521 | 9/1974 | Huston et al. | 220/3.3 |
| 4,199,072 | 4/1980 | Jacks | 220/3.4 |

*Primary Examiner*—Joseph Man-Fu Moy
*Attorney, Agent, or Firm*—Timothy J. Martin; J. Preston Oxenham

[57] ABSTRACT

A protective housing structure for underground devices, such as valves, meters and the like includes a base assembly constructed as an upstanding wall with an open bottom and open top. A lid encloses the top and may snap-fit into the base assembly. The base assembly is constructed so that a plurality of housing structures may be ganged together. To this end, opposite endwalls are preferably flat and are oriented vertically of the bottom. Interlock structure is provided on each endwall, for example, one endwall may be configured as a dovetail tongue and the other endwall as a dovetail channel that mateably receives the tongue on an adjacent endwall. The endwalls also may be selectively cut and removed to form a slot for longitudinal conduits, pipes and the like. The sidewalls of the base assembly are formed each of an upper panel and a lower panel. The lower panel is preferably constructed as a plurality of panel sections connected to one another along linear regions of reduced wall thickness, and the lower panel is connected to the upper panel along a linear region of reduced wall thickness. An installer may make a pair of spaced-apart incisions to one linear region to form a flap that may be deflected from the sidewall to create a sidewall opening for transverse conduit.

22 Claims, 4 Drawing Sheets

PROTECTIVE HOUSING STRUCTURE FOR UNDERGROUND DEVICES

BACKGROUND OF THE INVENTION

The present invention relates to a protective housing structure for underground devices such as meters, control valves and the like. Thus, the present invention is particularly useful as a protective enclosure for devices which are commonly connected to subterranean conduits, particularly water conduit systems, for example those employed in lawn and garden sprinkling systems and other irrigation systems. However, the present invention made be employed in any analgous field wherein a device is desired to be protected from its underground environment while at the same time is accessible from above ground.

Underground protective housings have been employed for some time in protecting pumps, valves, meters and the like. Typically, these enclosures have open bottoms so that they can be positioned over the underground device with the top of the housing being flush or slightly above or below the ground level. A lid forms a cover permitting access to the device. Early protective housings were constructed of concrete, but, more recently, these protective housings have been fabricated from metal or plastic. One example of such a prior art enclosure is shown in U.S. Pat. No. 3,952,908 issued 27 Apr. 1976 to Carson. This patent discloses a meter box which is truncated in shape so that its sidewalls and endwalls converge from a bottom edge to an open top. The open top is covered by a lid having a handle portion so that the lid is removable to permit access to the device placed within the protective housing. Permanent openings are configured in the endwalls of the box so that subterranean conduit may be attached to the device contained therein. The basic housing described in this patent is modified by those enclosures shown in U.S. Pat. No. 4,065,020 issued 27 Dec. 1977 and U.S. Pat. No. 4,153,176 issued 8 May 1979 to the same inventor.

A similar protective housing is shown in U.S. Pat. No. 4,163,503 issued 7 Aug. 1979 to McKennan. Again, this housing has a truncated shape and is provided with a specialized lid structure for enclosing the top. A pair of permanently configured openings are formed on oppositely disposed endwalls adjacent the open bottom of the housing. U.S. Pat. No. 3,984,023 issued 5 Oct. 1976 to Hodas discloses an underground protective housing in the form of a rectangular valve box that is made from separable walls which may be shipped in a dis-assembled state that may be readily assembled for on-site use. The utility meter container shown in U.S. Pat. No. 3,893,584 issued 8 July 1975 to Ledford is formed as three plastic parts which nest with one another for storage and shipment. A pair of service conduit couplers are attached, respectively, to the top and bottom of the container.

The above-described protective housings have proved suitable in the past for protecting a single underground device and, in some instances, have been successfully employed for housing a plurality of devices. In many sprinkler systems, a desired technique of installation is called manifolding which comprises the connection of several control valves in a side-by-side relation by means of standard-sized manifold tees. Recently, manifold tees had been especially designed to eliminate interconnecting pipes so that these manifold tees directly mate with one another in any desired serial configuration.

Due to the unitary configuration of the prior art housings described above, it is difficult if not impossible to enclose a plurality of serially connected manifold valves without the use of auxillary conduit between housing units. Furthermore, the prior art protective housings do not provide for the variety of geometric configurations desirable in interconnecting conduit and control devices. For example, while the above-described housing structures contemplate longitudinal conduits which enter through one end wall and exit through an opposite end wall, such housings do not provide for conduits exiting at a right angle to the entry conduit. This is a substantial disadvantage where manifold tees are employed since such manifold tees typically supply a plurality of distribution conduits that extend transverse to the longitudinal conduit to exit the protective housing at a right angle to discharge outlets. Furthermore, the existing housing structures do no provide for variance in vertical orientation of the interconnective conduits since they provide fixed conduit openings into the enclosure.

Accordingly, there remains a need for an improved underground protective housing which may receive and house various devices such as valves, meters, and the like which are connectable to underground interconnect elements such as pipe conduits and the like. There is a need for such a protective housing that may be employed with a variety of configurations and wherein a plurality of such housings may be ganged together in order to enclose a plurality of such underground devices. There is a further need to provide protective housing structure useful with manifold tees. There is a further need for such an enclosure which may be custom configured for the desired configuration of interconnect assemblies.

SUMMARY OF THE INVENTION

It is an object of the present invention to provide a new and useful housing for the protection of underground devices, such as control valves, meters and the like, which are connectable to subterranean interconnect elements such as conduit, pipes and the like.

It is another object of the present invention to provide a protective housing which may be custom configured for a particular orientation of interconnect elements, especially where such elements are at right angles to each other.

It is a further object of the present invention to provide a protective housing having an interlock structure so that a plurality of housings may be ganged together in order to receive a plurality of underground devices which are interconnected to one another in serial relation.

Yet another object of the present invention is to provide a protective housing wherein a plurality of housings may be ganged together for use with standard manifold tees without requiring the need for an auxillary conduit between the manifold tees.

According to the broad form of the present invention, then, a protective housing structure is provided and is adapted to house and protect devices mounted beneath ground level and which devices are connectable to underground interconnect elements such as conduit and the like. The protective housing structure includes a base assembly structured as an upstanding wall that forms an enclosure having an interior adapted to house at least one of the underground devices to be protected. The base assembly has a bottom edge defining an open bottom and a top edge defining an open top. Furthermore, the base assembly has first and second end wall portions which are oppositely disposed with respect to one another. An interlock structure is associated with each of the endwall portions and is operative to secure two of the protective housings together in an end-to-end relation so that the endwall portion of one of the housings faces the endwall portion of the other of the housings. A lid is sized and configured to be received in the open top and is mounted adjacent to the top edge to cover the enclosure.

Preferably, in the preferred embodiment of the present invention, one of the endwalls is configured as a dovetail tongue and the other of the endwalls is configured as a dovetail channel sized to mateably receive said tongue. Both the tongue and channel are oriented upwardly along their respective endwall portions and extend between the top and bottom edges. Thus, two of the housings may be ganged together by vertically engaging the dovetail tongue and channel. To this end, the endwall portions are preferably formed perpendicular to the open bottom in spaced apart parallel planes. In order to accommodate different configurations of interconnecting conduits, each of the endwalls has a portion of reduced wall thickness with each of these areas being contiguous with the bottom edge. Each area of reduced wall thickness may be cut in a selected shape so that the removed portion forms a slot through which a longitudinal interconnect element may extend to be connected to the device received within the protective housing. Thus, the areas of reduced thickness on the endwalls provide for configurable entryways for interconnect elements at each end of the box.

In order to accommodate perpendicular interconnect elements, the endwall portions are interconnected by spaced apart sidewall portions which complete the enclosure. Each of these sidewall portions is preferably formed as an upper panel and a lower panel which are connected together along a linear region of reduced wall thickness with this linear region being parallel to the bottom of the housing. Incisions may be cut in either or both of the sidewalls, as desired, with these incisions extending from the bottom edge to intersect and terminate at the selected linear region of reduced wall thickness. The lower panel then forms a flap which may be pivoted laterally outwardly and substantially parallel to the bottom of the housing and perpendicular to the sidewall to form a lateral opening having a selected width allowing conduits to exit perpendicularly to the protective housing. Preferably, each of the lower side panels include a plurality of parallel linear regions of reduced thickness so that the incisions may be made to a selected one of the linear regions to configure the flap in one of a selected number of vertical flap sizes.

Other features are present in the preferred embodiment of the present invention and include the use of a truncated lid that is snap-fit into the open top of the enclosure and rests against a seat defined by laterally inwardly projecting flanges adjacent the top edge of the upstanding wall. The lid is provided with a ball and socket snap lock, but the lid may be removed from the enclosure, if desired. To this end, open juxtaposed ports are formed in the lid to define a web therebetween that may be gripped by the jaws of a pair of pliers to facilitate removal of the lid. In addition, a slot may be formed in the perimeter of the lid to allow a prying tool, such as a screwdriver, to be inserted in the cavity in order that leverage may be applied to the edge of the lid. Alternate embodiments of the innerlocking structure for the end portion of the box are also described in modified embodiments of the present invention.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to protective housing structures which are designed to have a base assembly which is buried underground and a lid assembly at ground level so as to provide access to a device received within and protected by the housing structure. Accordingly, the present invention is specifically adapted for use in protective valves and control devices for use in sprinkler systems and the like. However, it should be unquestionably understood that the inventive concept contained in the present invention and defined in the claims has application for general purposes wherein it is a desired objective to protect any device mounted beneath ground level wherein such device is connectable to underground interconnect elements such as conduits and the like.

Figure 1:
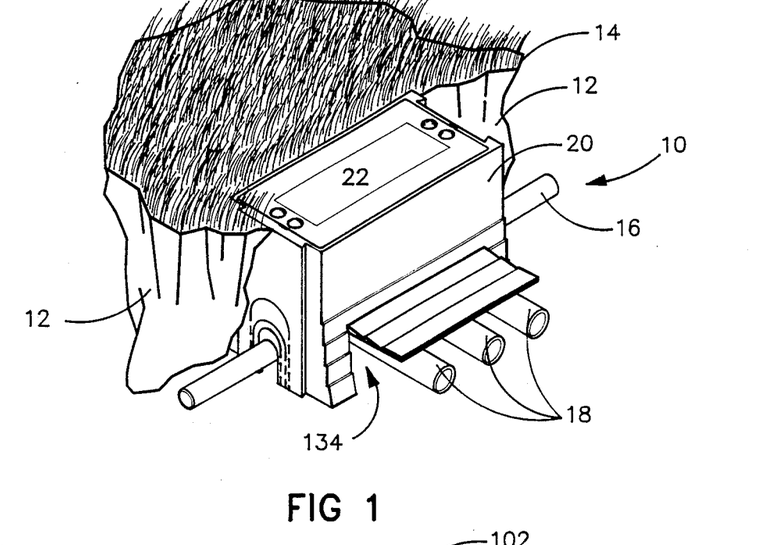
FIG. 1 is a perspective view of the protective housing structure according to the preferred embodiment of the present invention shown in its underground, operative orientation.

As is shown in FIG. 1, housing structure 10 according to the preferred embodiment of the present invention is constructed to have a base assembly 20 which is positioned in a subterranean environment such that base assembly 20 is embedded in the ground 12. Base assembly 20 mounts a cover or lid 22 at surface level 14 of ground 12. As more thoroughly described below, housing structure 10 is adapted to receive and protect devices contained therein, particularly where such devices are interconnected to conduits, such as linear conduit 16 and transverse conduits 18.

Figure 2:
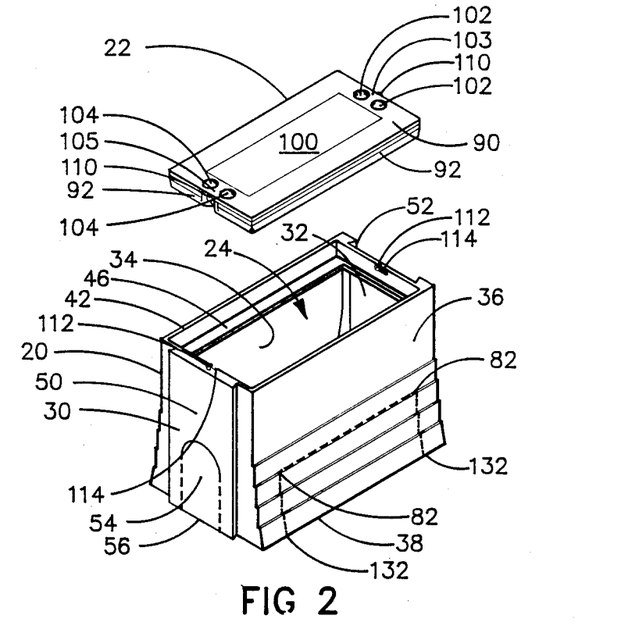
FIG. 2 is a perspective view of the preferred embodiment of the present invention, including the base assembly and lid assembly prior to use.
Figure 3:
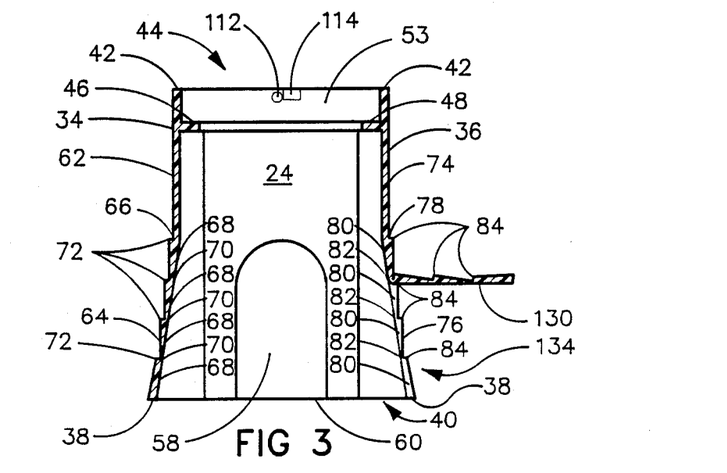
FIG. 3 is an end view in cross-section of the base assembly according to the preferred embodiment of the present invention.

The construction of base assembly 20 is best shown in FIGS. 2 and 3 where it should be appreciated that base assembly 20 is formed as an upstanding wall that encloses an interior 24. To this end, the preferred construction of base assembly 20 includes a first endwall 30, a second endwall 32, a sidewall 34 and a sidewall 36 constructed as an integral molded plastic unit. Accordingly, an upstanding wall is defined by endwalls 30,32 and sidewalls 34,36, and this upstanding wall extends from a bottom edge 38 defining an open bottom 40 which, in the preferred embodiment, is rectangular in shape. The upstanding wall extends from bottom edge 38 to a top edge 42 that defines an open top 44 which is again generally rectangular in shape. A pair of inwardly projecting flanges 46 and 48 are located in close spaced adjacent relation to top edge 42 to define a seat for lid 22. Each of endwalls 30 and 32 are substantially perpendicular to the bottom of base assembly 20 and are provided with cooperative interlocking structure so that, as described below, a plurality of base assemblies may be ganged together in end-to-end relation. As is shown in FIG. 2, first endwall 30 has an upwardly extending dovetail tongue 50 with a central wall 51, and second endwall 32 has an upwardly dovetail channel 52 with a channel bottom wall 53. Channel 52 is sized to receive a tongue 50 of an adjacent base assembly. Further, first endwall 30 has an area 54 of reduced wall thickness along central wall 51 which is contiguous at 56 with bottom edge 38. Likewise, second endwall 32 has an area 58 of reduced wall thickness along bottom wall 53 which is also contiguous at location 60, with bottom edge 38.

Each of sidewalls 34 ad 36 are constructed the same, and they are symmetric with one another about a vertical plane extending longitudinally through base assembly 20 from endwall 30 to endwall 32. Thus, as is shown in FIG. 3, sidewall 34 includes an upper sidewall panel 62 and a lower sidewall panel 64 connected to one another along linear region 66 of reduced wall thickness. Sidewall panel 64 includes a plurality of adjacent panel sections 68 connected to each other along linear regions of reduced thickness 70 which are parallel to both linear region 66 and bottom edge 38. Each of panel sections 68 include a vertical portion and a horizontal portion that form a plurality of parallel shoulders 72 such that a horizontal portion of each shoulder 72 is generally perpendicular to a vertical portion of shoulder 72.

Similarly, sidewall 36 is formed as an upper sidewall panel 74 and a lower sidewall panel 76 that are separated from one another along a linear region of reduced thickness 78. Lower sidewall panel 76 is divided into a plurality of panel sections 80 which are separated from one another by linear regions of reduced wall thickness 82 which are parallel to one another and to linear region 78 and also with bottom edge 38. The outer surface of panel sections 80 have shoulders 84 which are the same as shoulders 72, described with respect to lower sidewall panel 64. Accordingly, from a review of FIG. 3, it may be appreciated that upper sidewall panels 62 and 74 are substantially vertical and parallel to the longitudinal plane of base assembly 20 while lower sidewall panels 64 and 76 are downward and outwardly divergent with respect to one another. Therefore, open bottom 40 is larger than open top 44.

Figure 4:
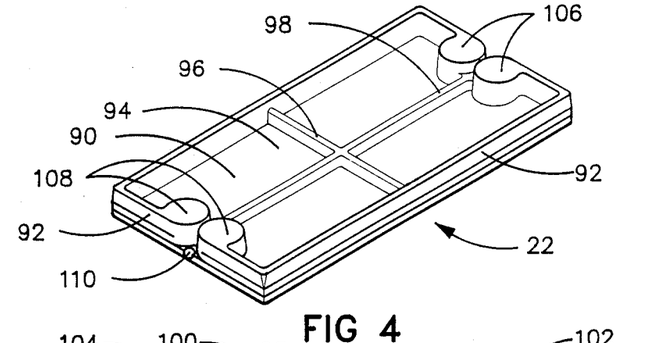
FIG. 4 is a perspective view of the underside of the lid assembly shown in FIG. 2.
Figure 5:
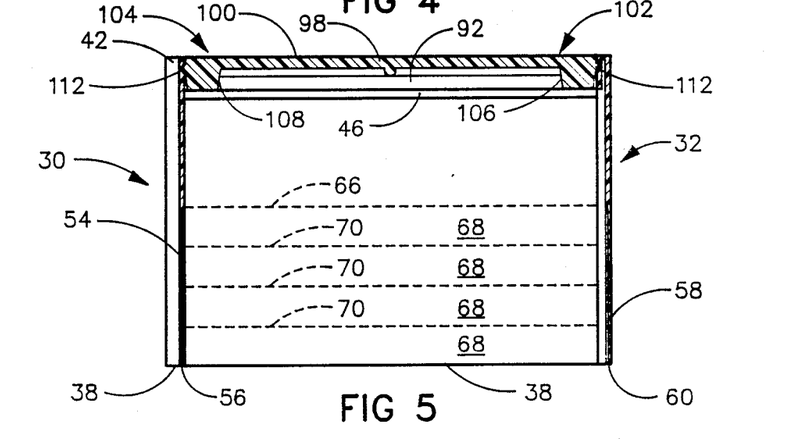
FIG. 5 is a side view in cross-section of the base and lid assembly according to the preferred embodiment of the present invention.

As is best shown in FIGS. 2 and 4, lid 22 has a main panel 90 and a perimeter edge portion 92 to facilitate placement of the lid into the open top. Thus, lid 22 is supported on flanges 46 and 48 and frictionally mounted between sidewalls 34,36 and endwalls 30,32. In the preferred embodiment of the present invention, bottom surface 94 of lid 22 is provided with reinforcing ribs 96 and 98 with rib 96 extending transversely across lid 22 and rib 98 extending longitudinally of lid 22. A top surface 100 of lid 22 is flat, and may be impregnated with a color that matches the surface of the ground into which it is placed. Thus, for example, upper surface 100 may be colored green so that it is unobtrusive when placed in a lawn environment. Furthermore, upper surface 100 may be provided with juxtaposed ports 102 and juxtaposed ports 104 which are respectively constructed out of formed ends 106 and 108 of perimeter edge portion 92, respectively.

Lid 22 is frictionally secured within open top 44 and, to this end, includes a snap-lock means for securing the lid in the engaged position. As is shown in FIGS. 2-4, this snap-lock includes a pair of nubs or balls 110 located on an end edge of lid 22 with these balls 110 sized to engage a pair of mating sockets 112 respectively formed on an upper edge of endwalls 30 and 32. Once lid 22 is snap-locked into open top 44, the frictional engagement of truncated edge portion 92 and the surrounding mull portion adjacent top edge 44, along with the snap-lock of balls 100 and sockets 112 make it difficult for lid 22 to be removed. Thus, two structures are provided to aid in the disengagement of lid 22 from base assembly 20. Specifically, ports 102 and 104 are provided and are sized to receive the jaws of a pair of pliers or other clamping tool so that respective webs 103 and 105 may be firmly grasped by the clamping jaws of the tool. Further, a pair of cavities 114 are provided adjacent sockets 112 with cavities 114 being configured to permit insertion of the edge of a prying tool between the top edge 42 of base assembly 20 and the perimeter edge 92 of lid 22. Such a prying tool may be a screwdriver or other narrow elongated instrument which may be inserted into a selected cavity 114 so that lid 22 may be leveraged out of base assembly 20 against top edge 42.

Figure 6:
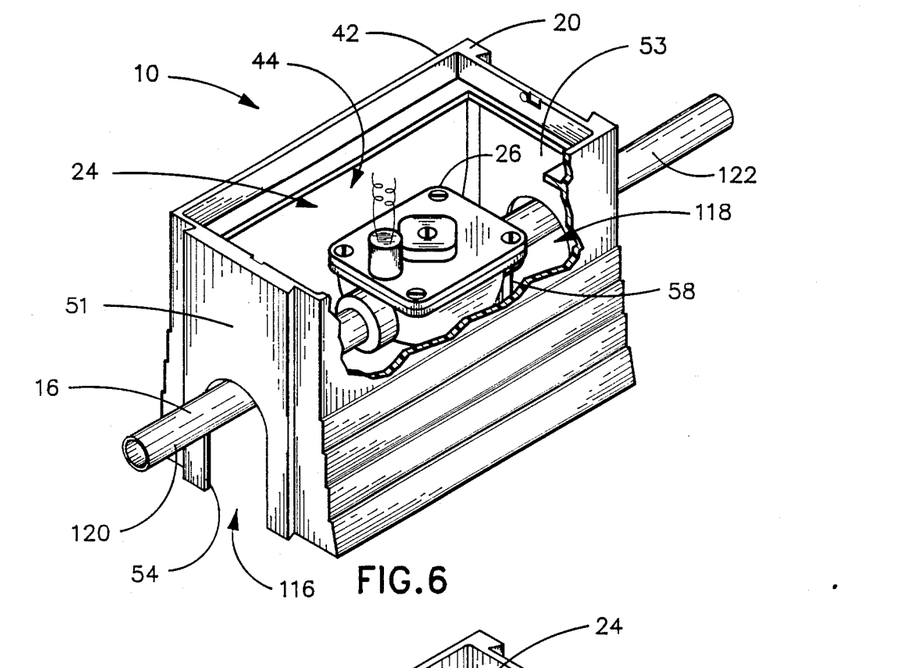
FIG. 6 is a perspective view partially cut away showing the base assembly for use with a single valve connected to a longitudinal conduit.

The use of a single housing structure 10 may now be most readily appreciated from a review of FIGS. 1-7. In many instances, it is desirable that a single underground device be enclosed within a housing structure 10 with this device being connected to a single longitudinal conduit extending through base assembly 20. Thus, as is shown in FIG. 6, a protected device 26 is interposed at a midportion between longitudinal conduit 16. In order to enclose device 26, the user selectively cuts out areas 54 and 58 of endwalls 30 and 32, respectively. This cut out portion leaves a pair of slots 116 and 118 which may slip respectively over end portions 120 and 122 of longitudinal pipe 16. Lid 22 may then be mounted in open top 44 so as to cover the open top of base assembly 20 and dirt may be packed around base assembly 20 until it is adjacent top edge 42. Divergent lower sidewall panels 64 and 72 help maintain base assembly 20 in a firmly implanted condition.

Figure 7:
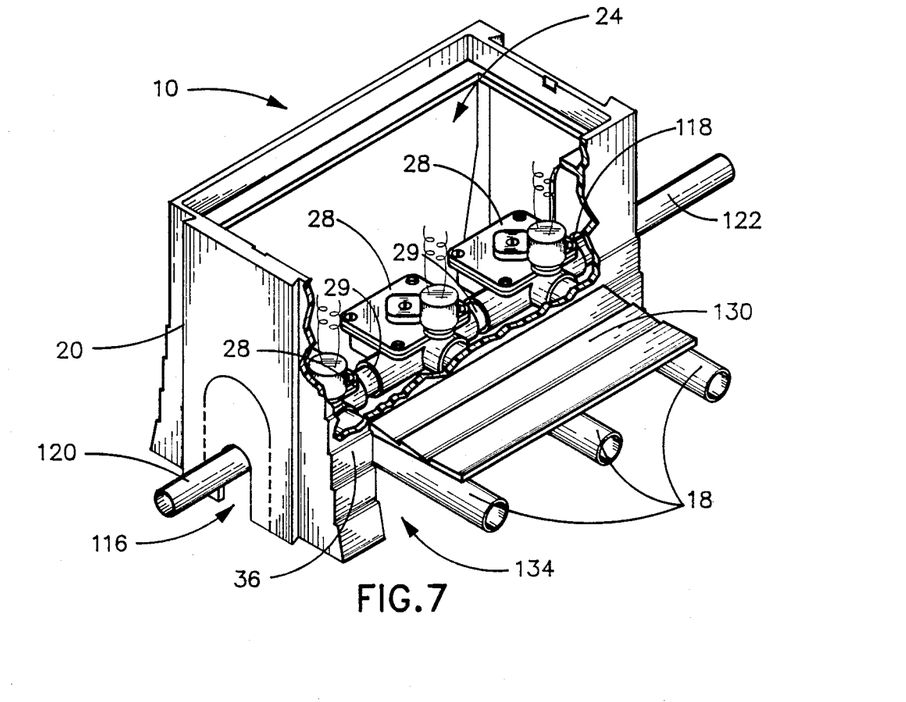
FIG. 7 is a perspective view partially broken away showing the base assembly in use with a manifold assembly including manifold tees and transverse conduits according the preferred embodiment of the present invention.

With particular reference to FIGS. 1, 2, 3 and 7, that housing structure 10 may also be used wherein transverse conduits 18 are desired to extend perpendicularly outwardly from a longitudinal conduit 16. Heretofore, housing structures have not been fabricated to provide structure which facilitates implementation of the housing structure with such a transverse conduit arrangement. Thus, as is shown in FIG. 7, end portions 120 and 122 are again bridged by slots 116 and 118, with interior 24 of base assembly 20 receiving three protected devices 28 secured to manifold tees 29. Each of manifold tees 29 is connected to a transverse conduit 18 which extends laterally outwardly of base assembly 20 through a flap 130 formed in one of the sidewalls, such as sidewall 38.

In installation the installer makes a pair of spaced apart incisions or cuts 132 a desired vertical height from bottom edge 38, such as shown in FIG. 2, until each cut 132 terminates at a desired linear region of reduced thickness 82. The installer then bends flap 130 outwardly away from sidewall 36 to form an opening 134 shown in FIGS. 1, 3 and 7. Transverse pipes 18 then extend transversely out of opening 134. It may be appreciated from a review of these figures that flap 30 may be pivoted about linear region of reduced thickness 82 until it is generally perpendicular to a respective upper sidewall panel such as sidewall panel 74, and is thus perpendicular to the vertical plane passing longitudinally through base assembly 20. To this end, shoulders 84 are provided to abut an upper adjacent panel section 80 to prevent hyperflexion of flap 130. Accordingly, flap 130 is positioned across transverse conduits 18 and helps prevent the ingress of dirt into interior 20. Furthermore, the horizontal dimension of flap 130 further helps prevent removal of base assembly 20 from the ground.

Figure 8:
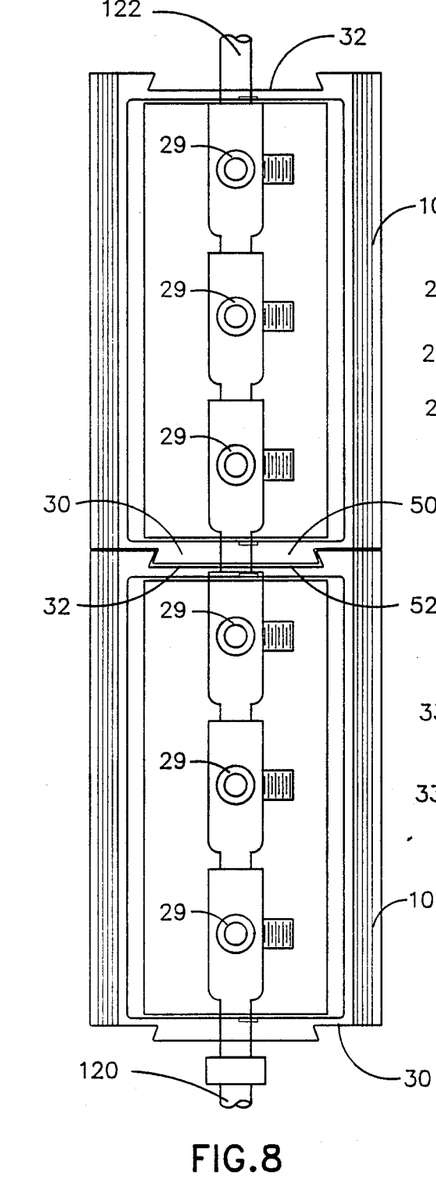
FIG. 8 is a top plan view of a pair of base assemblies interlocked with one another according to the preferred embodiment of the present invention.

As noted above, it is often desirable to have a plurality of devices arranged in the manifold assembly, it is desirable that two or more of the housing structures 10 be engageable with one another to provide a gang of interconnected support structures. Thus, by way of example, FIG. 8 shows a pair of housing structures 10 each of which receives three manifold tees 29 which may interconnect a device such as device 28 (not shown) to a transverse conduit 18 (again not shown). It is important to appreciate that the vertical dimensioning of endwalls 30 and 32 as well as the cooperative mated engagement of adjacent tongues 50 and channels 52 allow ganging of a plurality of housing structures 10 directly over the interconnecting manifolds without the need for auxillary conduit. To this end, it is desirable that the longitudinal dimension of each housing structure 10 be an interger multiple of the length of a standard dimension manifold tee. End portion 122 of the longitudinal pipe may therefore engage a first one of manifold tees 29 whereas a second end portion 122 may engage an opposite manifold tee 29.

Figure 9:
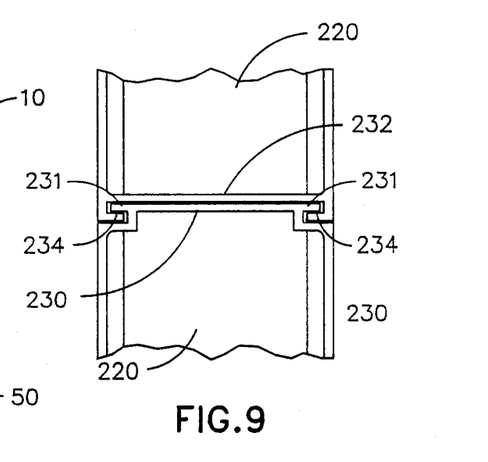
FIG. 9 is a top plan view of an alternate embodiment of a pair of base assemblies interlocked with another.
Figure 10:
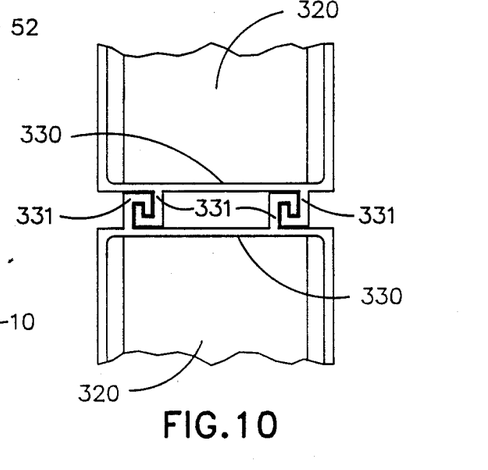
FIG. 10 is a top plan view, broken away, showing a second alternate embodiment of the base assemblies showing a third interlock structure according to the present invention.

It should also be understood and appreciated that different interlocking structures could be employed without departing from the scope of the present invention. Thus, for example, as is shown in FIG. 9, the interlocking means includes a pair of laterally projecting wings 231 formed on an endwall 230 with these wings mating with a pair of inwardly projecting shoulders 234 formed on adjacent endwall 232. A third embodiment is shown in FIG. 10 wherein each endwall 330 is provided with a pair of reversed curve lips 331 which are oriented to engage one another to prevent separation of adjacent base assemblies 320. The advantage of the structure shown in FIG. 10 is that each of the first and second endwall portions are identical so that any end portion of a base assembly 320 may be placed against and interlocked with any other adjacent end portion of an adjacent base assembly 320.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A protective housing structure adapted to house and protect devices mounted beneath ground level and connectable to underground interconnect elements such as conduit and the like, comprising a base assembly constructed as an upstanding wall forming an enclosure with an interior adapted to house at least one of said devices, said base assembly having a bottom edge defining an open bottom and a top edge defining an open top and having first and second end wall portions oppositely disposed with respect to one another, and cooperative interlocking means associated with each of said first and second end wall portions for securing two protective housings together in end-to-end relation with an end wall portion of one of said housings facing an end wall portion of the other of said housings each of said first and second end wall portions including a portion of reduced wall thickness contiguous with said bottom edge to provide areas each of which may be cut in a selected shape and the cut portion removed to form a slot through which an interconnect element may longitudinally extend to be connected to said device therein.

2. A protective housing according to claim 1 wherein said interlocking means incudes a dovetail tongue extending upwardly between said bottom and top edges along one of said endwall portions and a dovetail channel extending upwardly between said bottom and top edges along the other of said endwall portions, said tongue sized to be mateably received in said channel.

3. A protective housing according to claim 1 wherein said interlocking means includes a pair of laterally projecting wings along one of said endwall portions and a pair of inwardly projecting shoulders on the other of said endwall portions, said shoulders operative to mateably engage said wings.

4. A protective housing according to claim 1 wherein said interlocking means includes a pair of reverse curved lips extending upwardly along each of said endwall portions between said bottom and top edges.

5. A protective housing according to claim 1 wherein one of said endwall portions is configured as an upwardly extending dovetail tongue having a flat central wall section and the other of said endwall portions is configured as an upwardly extending dovetail channel having a bottom channel wall section and sized to mateably engage said tongue with said central wall section positioned along said bottom channel wall section.

6. A protective housing structure adapted to house and protect devices mounted beneath ground level and connectable to underground interconnect elements such as conduit and the like, comprising a base assembly constructed as an upstanding wall forming an enclosure with an interior adapted to house at least one of said devices, said base assembly having a bottom edge defining an open bottom and a top edge defining an open top and having first and second end wall portions oppositely disposed with respect to one another, a lid sized to be received in said open top and mounted adjacent said top edge to cover said enclosure, one of said end wall portions configured as an upwardly extending dovetail tongue having a flat central wall section and the other of said end wall portions configured as an upwardly extending dovetail channel having a bottom channel wall section and sized to matably engage said tongue with said central wall section positioned along said bottom channel wall section such that two protective housings may be secured together in end-to-end relation with an end wall portion of one of said housing facing an end wall portion of the other of said housings wherein each of said central wall and bottom channel wall sections include a portion of reduced wall thickness contiguous with said bottom edge to provide areas each of which may be cut in a selected shape with the cut portion removed to form a slot through which an interconnect element may longitudinally extend to be connected to said device therein.

7. A protective housing structure adapted to house and protect devices mounted beneath ground level and connectable to underground interconnect elements such as conduit and the like, comprising a base assembly constructed as an upstanding wall forming an enclosure with an interior adapted to house at least one of said devices, said base assembly having a bottom edge defining an open bottom and a top edge defining an open top and having first and second end wall portions oppositely disposed with respect to one another, a lid sized to be received in said open top and mounted adjacent said top edge to cover said enclosure, and cooperative interlocking means associated with each of said first and second end wall portions for securing two protective housings together in end-to-end relation with an end wall portion of one of said housings facing an end wall portion of the other of said housings said upstanding wall having sidewall portions extending in spaced apart relation between said first and second end wall portions, each of said sidewall portions defined by an upper sidewall panel and a lower sidewall panel connected to one another along a linear region of reduced wall thickness.

8. A protective housing according to claim 7 wherein said lower sidewall panels are outwardly divergent from one another in a direction from said open top to said open bottom.

9. A protective housing according to claim 7 wherein each of said lower sidewall panels includes a plurality of adjacent panel sections connected to one another each along a linear region of reduced wall thickness whereby said lower sidewall panel may be upwardly cut by a pair of spaced-apart incisions from said bottom edge to a selected linear region of reduced thickness to create a flap which may be folded outwardly of said enclosure along said lower region to provide a sidewall opening so that said interconnect elements can extend transversely through said sidewall opening to be connected to a said device housed therein.

10. A protective housing structure adapted to house and protect devices mounted beneath ground level and connectable to underground interconnect elements such as conduit and the like, comprising a base assembly constructed as an upstanding wall forming an enclosure with an interior adapted to house at least one of said devices, said base assembly having a bottom edge defining an open bottom and a top edge defining an open top, said base assembly including a sidewall portion separated into an upper sidewall panel and a lower sidewall panel by a linear region of reduced wall thickness whereby said lower sidewall panel may be upwardly cut by a pair of spaced-apart incisions from said bottom edge to said linear region to form a flap which may be folded outwardly of said enclosure along said linear region to provide a sidewall opening so that said interconnect elements can extend transversely through said sidewall opening to be connected to a said device housed therein, with said flap positioned across said interconnect elements thereby preventing the ingress of dirt into the interior and inhibiting removal of the base assembly from the ground.

11. A protective housing structure according to claim 10 wherein said lower sidewall panel includes a plurality of adjacent panel sections connected to one another each along a linear region of reduced wall thickness such that there are a plurality of linear regions of reduced wall thickness parallel to said bottom edge whereby said incisions may be cut to a selected common linear region to configure said flap to a selected vertical dimension corresponding to the number of panel sections through which the incisions are cut.

12. A protective housing structure according to claim 11 wherein each panel section has a shoulder adjacent an upper adjacent panel section and adapted to abut the adjacent panel section whereby said flap is supported against the adjacent panel section in substantially perpendicular relation to said lower sidewall panel when said incisions are made to the respective linear regions between the adjacent panels, said shoulders preventing hyperflexion of said flap.

13. A protective housing structure adapted to house and protect devices mounted beneath ground level and connectable to underground interconnect elements such as conduit and the like, comprising a base assembly constructed as an upstanding wall forming an enclosure with an interior adapted to house at least one of said devices, said base assembly having a bottom edge defining an open bottom and a top edge defining an open top and having first and second end wall portions oppositely disposed with respect to one another, a lid sized to be received in said open top and mounted adjacent said top edge to cover said enclosure, and cooperative interlocking means associated with each of said first and second end wall portions for securing two protective housing together in end-to-end relation with an end wall portion of one of said housings facing an end wall portion of the other of said housings said first and second end wall portions having areas of a reduced wall thickness and positioned in oppositely disposed relation to one another, said areas contiguous with said bottom edge to provide areas which may be cut in a selected shape to form a slot through which an interconnect element may longitudinally extend to be connected to said device therein, and a lid assembly operative to be received and mounted by said wall to extend across and cover said open top adjacent said top edge.

14. A protective housing according to claim 13 wherein said base assembly has sidewall portions extending in spaced apart relation between said wall portions, each of said sidewall portions defined by an upper sidewall panel and a lower sidewall panel connected to one another along a linear region of reduced wall thickness.

15. A protective housing according to claim 14 wherein said upper panels are parallel to one another and said lower sidewall panels are outwardly divergent from one another in a direction from said open top to said open bottom.

16. A protective housing according to claim 14 wherein each of said lower sidewall panels includes a plurality of adjacent panel sections each connected to one another along a linear region of reduced wall thickness whereby said lower sidewall panel may be upwardly cut by a pair of spaced-apart incisions from said bottom edge to a selected said linear region to form a flap which may be folded outwardly of said enclosure along said lower region to provide a sidewall opening so that said interconnect elements can extend transversely through said sidewall opening to be connected to a said device housed therein.

17. A protective housing assembly adapted to house underground devices such as meters, control valves and the like which are connected to subterranean conduits whereby said devices are protected while being accessible for maintenance, comprising:

a base assembly having surrounding, upstanding wall forming an enclosure with an interior adapted to house at least one of said devices, said wall having a bottom edge oriented in a bottom edge plane and defining an open bottom and a top edge oriented in a top edge plane parallel to said bottom edge plane and defining an open top;

said upstanding wall including a pair of end walls oriented in opposed parallel relation to one another and perpendicularly to said bottom and top edge planes and a pair of spaced apart sidewalls interconnecting said end walls, each said sidewall defined by an upper sidewall panel and a lower sidewall panel connected thereto along a linear region of reduced wall thickness whereby said lower sidewall panel may be upwardly cut by a pair of spaced-apart incisions from said bottom edge to said linear region to form a flap which may be folded outwardly of said enclosure along said linear region to provide a sidewall opening so that said interconnect elements can extend transversely through said sidewall opening to be connected to a said device housed therein, with said flap positioned across said interconnect elements thereby preventing the ingress of dirt into the interior and inhibiting removal of the base assembly from the ground, said lower sidewall panels divergent from one another in a direction from said open top to said open bottom;

interlocking means associated with each of said end walls for securing two protective housing assemblies together in end-to-end relation with an end wall of one of said housing assemblies adjacent an end wall of the other of said housing assemblies; and a lid assembly sized to be received in said open top and releasably secured adjacent said top edge to cover said enclosure in an engaged position whereby said housing assembly may be buried with said top edge adjacent the surface of the ground.

18. A protective housing assembly according to claim 17 wherein said upstanding wall includes a pair of flanges located in closely-spaced relation to said top edge and projecting into the interior of said enclosure to define a seat for said lid assembly, said lid assembly being supported on said flanges and frictionally mounted between said sidewalls and said endwalls.

19. A protective housing assembly according to claim 18 wherein said lid assembly has a perimeter edge portion that is truncated to facilitate placement of said lid assembly into said open top.

20. A protective housing assembly according to claim 18 wherein said lid assembly and said wall include snap-lock means for securing said lid assembly in the engaged position.

21. A protective housing assembly according to claim 20 including at least two juxtaposed ports formed in an exposed surface of said lid whereby said lid assembly may be mechanically gripped by jaws of a clamping tool to facilitate removal of said lid assembly from the engaged position.

22. A protective housing assembly according to claim 20 including a cavity formed in said perimeter edge to permit insertion of a prying tool between the top edge and said perimeter edge to facilitate removal of said lid assembly from the engaged position.

* * * * *